United States Patent
Bryant et al.

(10) Patent No.: US 6,561,429 B2
(45) Date of Patent: May 13, 2003

(54) ADJUSTABLE READER ARRANGEMENT AND METHOD OF READING ENCODED INDICIA FORMED ON AN OBJECT

(75) Inventors: Robert C. Bryant, Honeoye Falls, NY (US); David J. Nelson, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/119,882

(22) Filed: Jul. 21, 1998

(65) Prior Publication Data

US 2003/0071127 A1 Apr. 17, 2003

(51) Int. Cl.[7] .................................................. G06K 7/10
(52) U.S. Cl. ................... 235/462.43; 235/454; 235/487
(58) Field of Search ...................... 235/462.38, 462.35, 235/462.36, 462.37, 462.43, 462.44, 462.45, 462.46, 472.01, 494, 487; 283/72, 85, 92, 94, 117, 901; 355/40

(56) References Cited

U.S. PATENT DOCUMENTS

| | | | |
|---|---|---|---|
| 4,375,058 A | | 2/1983 | Bouma et al. ............ 340/146.3 |
| 4,672,184 A | * | 6/1987 | Fujiwara et al. ........ 235/462.01 |
| 4,681,548 A | * | 7/1987 | Lemelson ................... 434/311 |
| 4,904,853 A | | 2/1990 | Yokokawa .................. 235/487 |
| 4,939,356 A | | 7/1990 | Rando et al. ............... 235/467 |
| 4,968,883 A | * | 11/1990 | Leyshon et al. ............ 250/239 |
| 4,983,818 A | * | 1/1991 | Knowles ............. 235/472.01 X |
| 4,983,996 A | | 1/1991 | Kinoshita ..................... 356/76 |
| 5,140,141 A | * | 8/1992 | Inagaki et al. ......... 235/462.01 |
| 5,151,581 A | | 9/1992 | Krichever et al. .......... 235/467 |
| 5,153,417 A | * | 10/1992 | Sakai et al. ................. 235/457 |
| 5,276,472 A | | 1/1994 | Bell et al. ..................... 354/76 |
| 5,291,007 A | * | 3/1994 | Sakai .................... 235/462.01 |
| 5,314,336 A | * | 5/1994 | Diamond et al. ........... 434/169 |
| 5,321,244 A | * | 6/1994 | Maloney et al. ........ 235/468 X |
| 5,347,113 A | * | 9/1994 | Reddersen et al. ..... 235/462.01 |
| 5,477,044 A | * | 12/1995 | Aragon ................... 235/472.01 |
| 5,478,998 A | | 12/1995 | Charych et al. ........ 235/462.01 |
| 5,479,002 A | * | 12/1995 | Heiman et al. ......... 235/472.01 |
| 5,483,052 A | * | 1/1996 | Smith, III et al. ....... 235/472.01 |
| 5,502,304 A | | 3/1996 | Berson et al. .............. 258/271 |
| 5,510,608 A | | 4/1996 | Williams ..................... 235/494 |
| 5,574,519 A | | 11/1996 | Manico et al. .............. 396/429 |
| 5,591,953 A | * | 1/1997 | Rockstein et al. .. 235/462.35 X |
| 5,655,164 A | | 8/1997 | Tsai ............................ 396/312 |
| 5,661,292 A | * | 8/1997 | Knowles et al. ........ 235/472.01 |
| 5,692,225 A | | 11/1997 | Bernardi et al. ............ 396/318 |
| 5,757,468 A | | 5/1998 | Patton et al. .................. 355/40 |
| 5,763,865 A | * | 6/1998 | Swift et al. ............. 235/472.01 |
| 5,767,501 A | * | 6/1998 | Schmidt et al. ........ 235/472.01 |
| 5,774,752 A | | 6/1998 | Patton et al. ................ 396/312 |
| 5,790,330 A | | 8/1998 | Sugiyama ....................... 360/1 |
| 5,801,067 A | * | 9/1998 | Shaw et al. ............. 235/468 X |
| 5,945,656 A | * | 8/1999 | Lemelson et al. ...... 235/462.01 |
| 5,979,764 A | * | 11/1999 | Swyst et al. ......... 235/462.43 X |
| 2002/0089653 A1 | * | 7/2002 | Iida ............................. 355/40 |

FOREIGN PATENT DOCUMENTS

| | | | |
|---|---|---|---|
| JP | 9-141210 A | * | 6/1997 |
| JP | 10-97733 A | * | 4/1998 |
| JP | 2002-63091 A | * | 2/2002 |

* cited by examiner

*Primary Examiner*—Michael G. Lee
*Assistant Examiner*—Jared J. Fureman
(74) *Attorney, Agent, or Firm*—Norman Rushefsky

(57) ABSTRACT

Adjustable reader arrangement and method of reading encoded indicia formed on an object. The reader arrangement comprises a base and a detector removably connected to the base for detecting the indicia. The detector has a first portion thereof adapted to be removably connected to the base and also has a second portion thereof pivotably adjustable into alignment with the indicia formed on the object. An emitter is coupled to the detector for emitting a signal indicative of the indicia detected by the detector. The reader arrangement is ergonomically conducive to reading encoded information on the object as an operator brings the object in the vicinity of the reader.

16 Claims, 4 Drawing Sheets

ADJUSTABLE READER ARRANGEMENT AND METHOD OF READING ENCODED INDICIA FORMED ON AN OBJECT

BACKGROUND OF THE INVENTION

This invention generally relates to apparatus and methods for extracting sound data and more particularly relates to an adjustable reader arrangement and method of reading encoded indicia formed on an object.

It is often desirable to encode data, such as sound data, onto a reflective print having an image thereon. The sound data, which may be optically readable, provides information concerning the image, such as day and date the image was created. In this regard, the sound data may be encoded onto the print so that it overlays the image or, alternatively, encoded in a margin surrounding the image on the print. Moreover, a reader is typically provided for reading the sound data and emitting sound corresponding to the sound data read by the reader.

In this regard, devices for producing an audio signal from printed code are known. For example, U.S. Pat. No. 4,375,058 titled "Device For Reading A Printed Code And For Converting This Code Into an Audio Signal" which issued Feb. 22, 1983 in the name of Herman Bouma, et al. discloses a device having a scanner for reading a visible code contained on a carrier and producing an audio signal in response to the code read by the scanner. The carrier itself contains information, such as text or picture, in addition to the code. The scanner of the Bouma, et al. patent is moved by hand into the area of the code and the code is optically read whereupon an acoustic generator is stimulated for producing a sound signal. However, a problem associated with the Bouma, et al. patent is that the scanner must be moved by hand into the area of the code. This can be time-consuming and laborious when there are a multiplicity of individual carriers to be scanned. Thus, the Bouma et al. patent does not provide for a less time-consuming and less laborious hands-free operation of the scanner.

Moreover, it known to imprint sound data in the form of machine readable code, such as barcode, onto a still image reflection print. For example, U.S. Pat. No. 4,983,996 titled "Data Recording Apparatus For Still Camera" which issued Jan. 8, 1991 in the name of Satoshi Kinoshita discloses a still camera having a microphone to which an external voice is input. A voice signal is generated and converted into visible barcode pattern data, which is recorded onto the camera's film. Once the film is developed and a print is produced, a barcode reader can be used to read and decode the barcode into the original voice signal. The voice signal is realized as a voice when the voice signal is generated through a speaker. Thus, this patent discloses recording sound data by placing barcode information onto a print, which also contains the printed image corresponding to the barcode information. However, placement of visible sound data onto the print along with the image interferes with aesthetic enjoyment of the printed image. Therefore, another problem in the art is interference with aesthetic enjoyment of a printed image due to visibly encoded barcode information obscuring at least some portion of the image.

Use of invisible ink to form a barcode on an object is disclosed in U.S. Pat. No. 5,502,304 titled "Barcode Scanner For Reading A Visible Ink And A Luminescent Invisible Ink" issued Mar. 26, 1996 in the name of William Berson, et al. According to this patent, a lower layer barcode is written on an object with a visible ink and an upper layer barcode is written over the lower layer barcode with an ink that is invisible to the naked eye. The lower layer barcode is read by a first "illumination source" emitting a first wavelength of incident radiation and a first sensor which detects the reflected radiation. The upper layer barcode is read by a second illumination source emitting a second wavelength of incident radiation and a second sensor which detects the reflected radiation. That is, this apparatus reads the upper and lower level barcodes by detecting different wavelengths of reflected radiation. Thus, in the same amount of space that would otherwise be utilized to print one barcode, the Berson et al. device prints two or more barcodes over-laid one upon the other. Although the Berson et al. patent discloses use of invisible barcode information and a technique to increase the amount of barcode information available in a given space on an object, the lower layer barcode is nonetheless visible. This visible lower layer barcode can interfere with aesthetic enjoyment of a printed image when laid-down on the image. In addition, although the Berson et al. technique allows storing more barcode information on the object because there are several layers of barcode data on the object, the several layers of barcode information necessarily must be individually printed to store the information represented in each layer. Printing each layer individually is time consuming and therefore undesirable. Therefore, yet another problem in the art is time consumed in printing multilayered barcode data.

Some readers are hand-held adjustable readers. An adjustable hand-held symbology reader is disclosed in U.S. Pat. No. 5,477,044 titled "Symbology Reader With A Variable Orientation Head" issued Dec. 19, 1995 in the name of Joel T. Aragon. This patent discloses a hand-held symbology reader having a handle for grasping by a user and a head attached to the handle for adjustable angular movement of the head relative to the handle. The head is also rotatable about three axes of rotation relative to the handle. The user rotates the head of the hand-held reader until the longitudinal axis of an imaging area in the reader coincides with a longitudinal axis of symbology.to be read. This patent also discloses that the head can be pointed at a target object having the symbology thereon while the handle is held in a fixed position relative to the target object. However, Aragon's symbology reader is hand-held which makes use thereof time-consuming and laborious when reading symbology belonging to a multiplicity of target objects bearing the symbology.

Although the prior art recited hereinabove discloses various techniques for forming sound-encoded information and reading that information, the prior art nonetheless possess the problems of absence of hands-free operation of the scanner, interference with aesthetic enjoyment of a printed image due to visibly encoded information obscuring at least some portion of the image, and time consuming printing of multilayered barcode information.

Therefore, there has been a long-felt need to provide an adjustable reader arrangement and method of reading encoded indicia, such as sound-encoded indicia, formed on an object in a manner such that the prior art problems recited hereinabove are overcome.

SUMMARY OF THE INVENTION

An object of the present invention is to provide an adjustable reader arrangement and method of reading encoded indicia, such as sound-encoded indicia, formed on an object.

With this object in view, an embodiment of the present invention resides an adjustable reader arrangement for reading encoded indicia formed on an object, comprising: a base; a detector removably connected to the base for detecting the indicia, the detector having a first portion adapted to be removably connected to the base and a second portion adjustable into alignment with the indicia formed on the object; and an emitter coupled to the detector for emitting a signal indicative of the indicia detected by the detector.

A feature of the present invention is the provision of a detector having a pivotable portion thereof adjustable by a user of the reader arrangement to an angle convenient for the user.

Another feature of the present invention is the provision of a detector having a rotatable portion thereof adjustable by a user of the reader arrangement to a position convenient for the user.

An advantage of the present invention is that an object containing corrupted indicia is nonetheless readable.

Another advantage of the present invention is that indicia may be surrounded by a border area which does not contain the indicia.

Another advantage of the present invention is that redundant indicia placed on a second side of the object can be read in order to recreate identical indicia placed on a first side of the object for archival purposes.

Yet another advantage of the present invention is that the reader arrangement is ergonomically conducive to hearing sound-encoded information as an operator simultaneously views an image appearing on the print.

A further advantage of the present invention is that the reader arrangement is independent of an external power source.

Still another advantage of the present invention is that encoded information appearing on a multiplicity of prints can be conveniently read less laboriously and in shorter time, when compared to prior art devices.

These and other objects, features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing-out and distinctly claiming the subject matter of the present invention, it is believed the invention will be better understood from the following description when taken in conjunction with the accompanying drawings wherein:

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
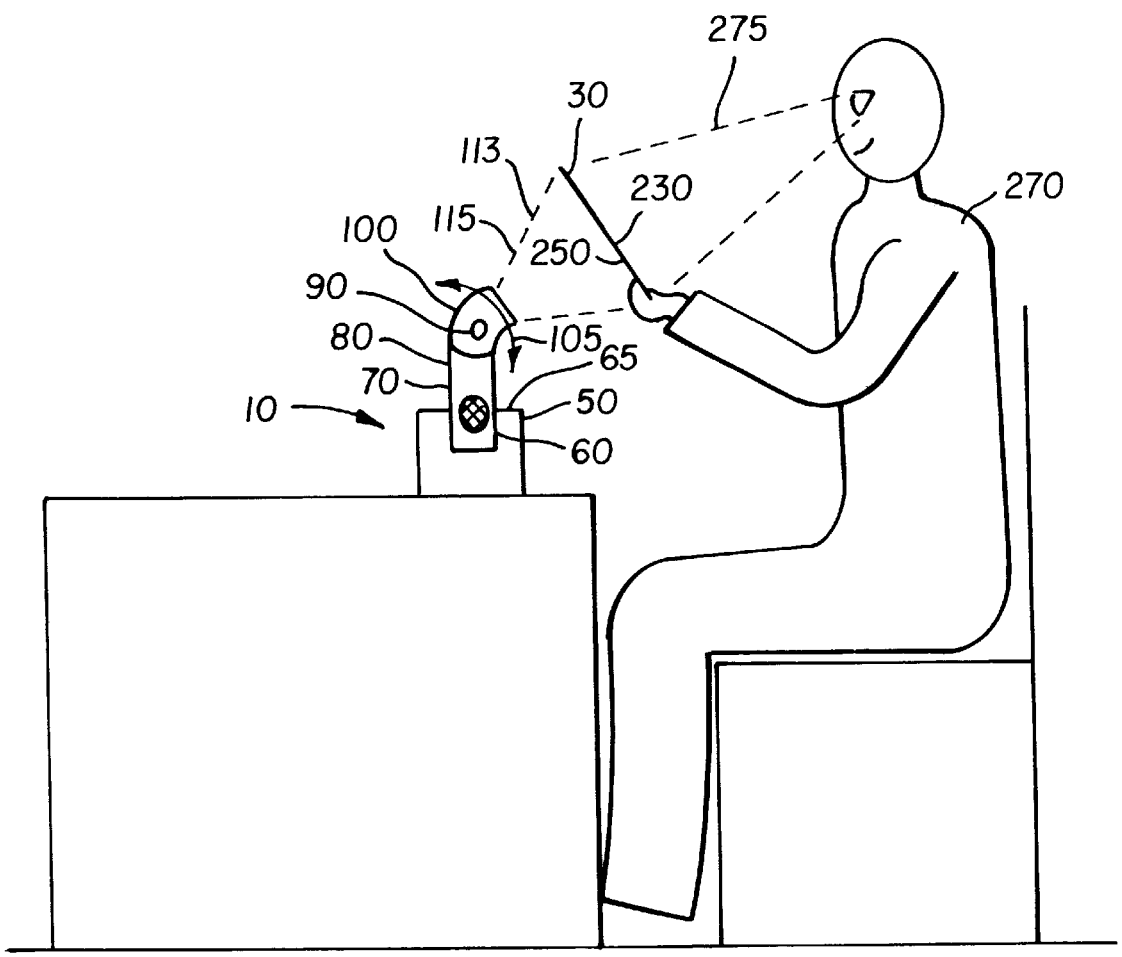
FIG. 1 is a view in elevation of a reader arrangement for reading encoded indicia present on a print having a first side and a second side, the reader arrangement having at least a first degree freedom of movement.
Figure 2:
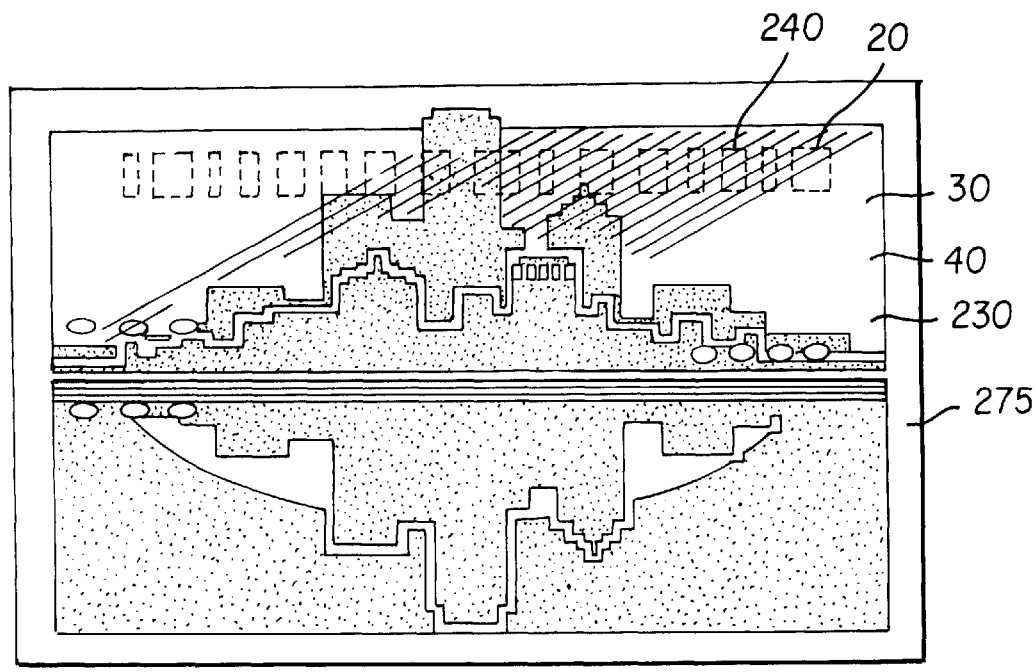
FIG. 2 shows an image printed on the first side of the print, this first side also containing first encoded indicia invisibly overlaying a portion of the image.
Figure 3:
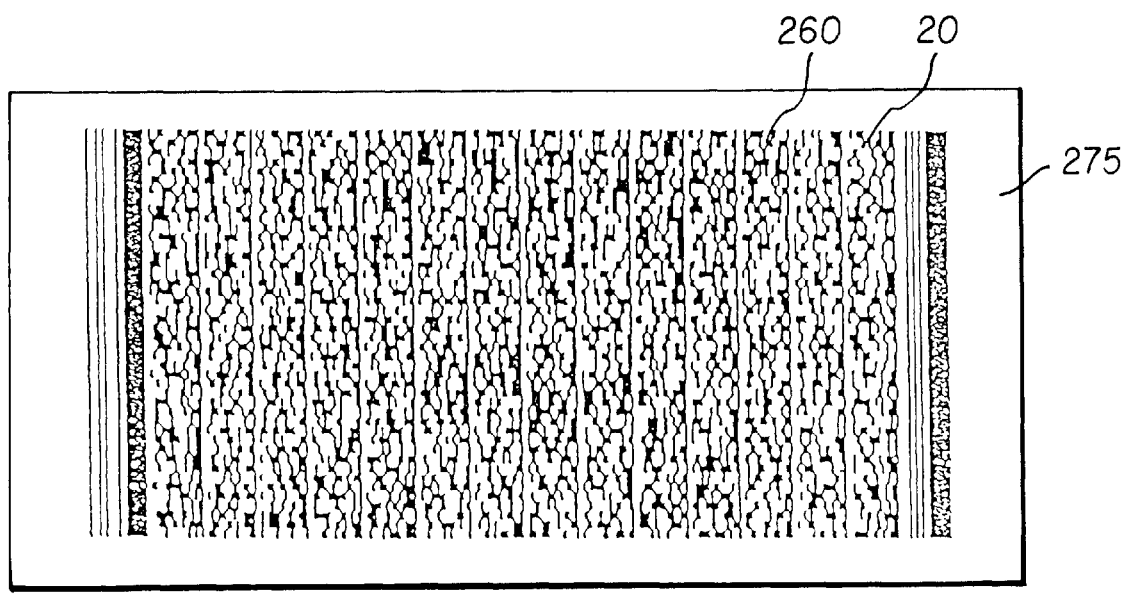
FIG. 3 shows the second side of the print, this second side containing visible second encoded indicia thereon.

Therefore, referring to FIGS. 1, 2 and 3, there is shown an adjustable reader arrangement, generally referred to as 10, for reading encoded indicia, such as sound-encoded indicia 20, formed on an object, such as a reflective print 30 having an image 40 thereon. For reasons disclosed more fully hereinbelow, print 30 is disposed in a predetermined orientation with respect to reader arrangement 10. Reader arrangement 10 comprises a portable base 50 having a recess therein, such as a slot 60 formed in a top surface 65 of base 50, for reasons described in detail hereinbelow.

Figure 4:
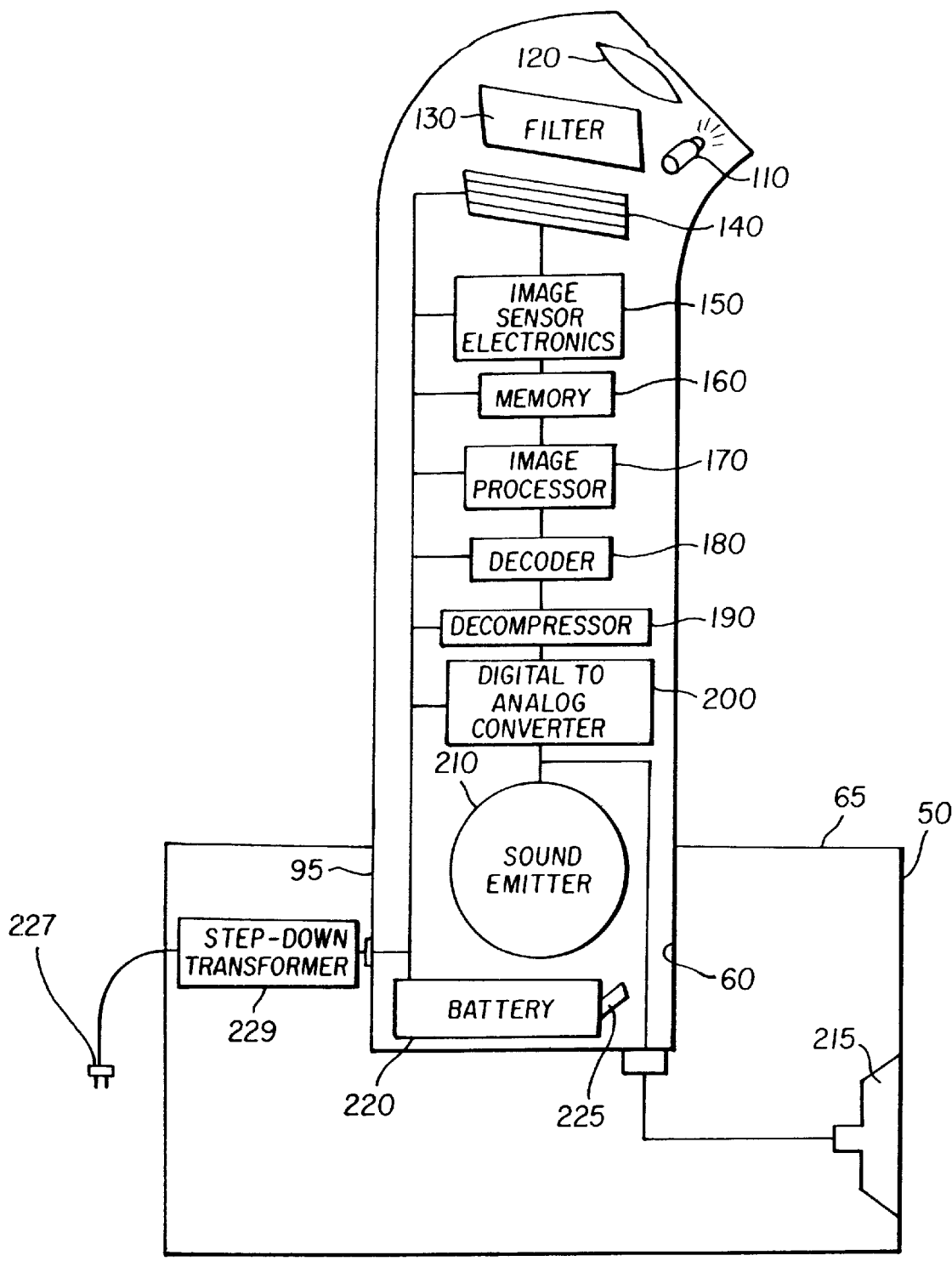
FIG. 4 is a view in vertical section of the reader arrangement.

Referring to FIGS. 1 and 4, a detector 70 for detecting indicia 20 has a first portion 80 having a pivot pin 90, for reasons disclosed presently. In addition, first portion 80 includes an extreme portion 95 thereof sized to be matingly but removably received in slot 60, so that first portion 80 is stationary with respect to base 50 when extreme portion 95 is received in slot 60. Moreover, detector 70 includes an integrally connected second portion 100 adjustably pivotable about pivot pin 90 generally in a direction illustrated by a double headed arrow 105. Thus, it may be appreciated that pivot pin 90 interconnects first portion 80 and second portion 100. In this regard, second portion 100 is preferably pivotable in an arc of approximately 120 degrees with respect to first portion 80, for reasons disclosed in detail hereinbelow. In a manner disclosed hereinbelow, second portion 100 is pivotable into alignment with indicia 20 formed on print 30 while print 30 is disposed in its predetermined orientation.

Referring again to FIGS. 1 and 4, detector 70 may comprise a light source 110 for emitting an incident light beam 113 therefrom which illuminates indicia 20 and which is to be reflected by indicia 20. Light reflected from indicia 20 defines a reflected light beam 115. Detector 70 further comprises a focusing lens 120 for focusing reflected light beam 115 onto a spectral filter 130. Filter 130 is co-axially aligned with, but spaced-apart from, lens 120 for letting through a predetermined wavelength of reflected light beam 110 and blocking all other wavelengths. Therefore, filter 130 will only allow the wavelength of reflected light beam 115 corresponding to the fluorescence or absorption wavelengths of reflected light beam 115. Alternatively, filter 130 may be coated onto lens 120, rather than being spaced-apart from lens 120, so that detector 70 is compact. However, it may be appreciated that filter 130 need not be present in the case where visible indicia are read. Moreover, more than one filter 130 may be present in detector 70 for reading invisible as well as visible indicia 20. This technique is disclosed in commonly assigned U.S. patent application Ser. No. 09/097,975, filed Jun. 16, 1998 in the names of Robert C. Bryant et al., the disclosure of which is hereby incorporated by reference. According to this U.S. patent application Ser. No. 09/097,975, a camera normally used for digital photography and/or reading of invisible data is also used for reading visible data by means of multiple filters.

Referring yet again to FIGS. 1 and 4, a two-dimensional array photodetector 140, such as a CCD (Charge-Coupled Device), is in optical communication with filter 130 for detecting reflected beam 115 passing through filter 130.

Alternatively, photodetector 140 may be a CMOS device, which is a device formed by the combination of a PMOS (p-type-channel metal oxide semiconductor device) material with an NMOS (n-type-channel metal oxide semiconductor device) material. Thus, photodetector 140 converts reflected light beam 110 into electronic digital form. Detector 70 also includes image sensor electronics 150 for driving photodetector 140 data capture. That is, sensor electronics 150 controls rate of data capture and converts analog charges on photodetector 140 into digital data format. Electrically connected to sensor electronics 150 is a memory 160. The purpose of memory 160 is to store the digital representation of indicia 20. In addition, electrically connected to memory 160 is an image processor 170. Image processor 170 retrieves data from memory 160 and manages the order in which the data is decoded and decompressed in a decoder 180 and a decompressor 190, respectively. Decoding and decompression of this data is preferably performed by a suitable software module, such as the "AMBE-1000 Voice Coder" available from Digital Voice Systems, Incorporated. Digital output data from decompressor 190 is converted to an analog signal by a digital to analog converter 200. The analog signal is supplied to a first sound emitter 210 and/or to a second sound emitter 215 (i.e., to a speaker) capable of emitting sound indicative of the indicia 20 detected by detector 70.

Still referring to FIGS. 1 and 4, a power source, such as a rechargeable battery 220, is disposed in detector 70 and coupled to photodetector 140, image sensor electronics 150, memory 160, image processor 170, decoder 180, decompressor 190, and digital to analog converter 200 for supplying electrical power to these components in order to electrically operate detector 70. To this extent, reader arrangement 10 includes its own power source (i.e., battery 220) disposed in detector 70. A battery switch 225 may be electrically connected to battery 220 for enabling battery 220. Alternatively, an electrical connection 227 and a step-down transformer 229 (as shown) may be provided for electrically connecting detector 70 to an external power supply (not shown).

Referring to FIGS. 1, 2 and 3, print 30 includes a first side 230 having a first sound-encoded indicia 240 thereon detectable by detector 70. That is, indicia 20, when imprinted on first side 230, is defined herein to be the first sound indicia 240. First sound indicia 240 is preferably dye laid-down over at least a portion of image 40 and contains encoded therein a first quantity of sound information preferably regarding image 40. For example, this first quantity of sound information may be the day and date image 40 was captured. By way of example only and not by way of limitation, first sound indicia 240 may be a barcode such as UPC, EAN, Code 1, Code 39, Code 93, Code 49 or PDF-417. However, first sound indicia 240 is preferably formed of a dye substantially invisible to the naked eye in order not to interfere with aesthetic enjoyment of image 40. More specifically, indicia 240 is preferably a dye having spectral absorption in the invisible infrared region or ultraviolet region of the radiation spectrum. Such a dye is selected so that the dye does not absorb or fluoresce light in the human visible spectrum, but which is nonetheless visible to optical reading devices capable of illuminating indicia 20 with infrared light or ultraviolet light. For this purpose, the dye may be 4,4"-bis(triazin-2-ylamino)stilbene-2,2'-disulfonic acids; 2-(stilben-4-y)naphthotriasoles; or 2-(4-phenylstelben-4-yl)benzoxazoles, or other suitable dye.

Referring again to FIGS. 1, 2 and 3, print 30 also includes a second side 250 having a second sound-encoded indicia 260 thereon detectable by detector 70. That is, indicia 20, when imprinted on second side 230, is defined herein to be the second sound indicia 260. Second sound indicia 260 is a dye laid-down on second side 250 and contains encoded therein a second quantity of sound information preferably regarding image 40, which second quantity of sound information may be greater than, less than, or equal to the first quantity of sound information contained on first side 230 of print 30. In this regard, second sound indicia 260 may be imprinted over the entirety of second side 250. The possibility exists that the second side indicia 260 may be obscured by the fingers of the operator as the operator 270 handles the print 30, It may be understood from the teachings herein that indicia may be surrounded by a border 275 area which does not contain the indicia. The border 275 solves the problem of obstruction by the fingers of the operator. Another technique to solve the hereinabove recited problem is to provide redundant information in indicia on second side 250 or first side 230. In this regard, information contained on, for example, the second side 250 may contain portions that are redundant with other portions of information on second side 250. The advantage of this redundant information is that dispite being obscured in part by a finger, the information on the remainder of the print that is not obscured is adequate to retrieve the entire amount of data.

However, second sound indicia 260, which also may be in the form of a barcode, is preferably formed of a dye visible to the naked eye. More specifically, second sound indicia 260 is a dye having spectral absorption in the visible region of the radiation spectrum. Such a dye is selected so that the dye absorbs or fluoresces light in the human visible spectrum and so that indicia 20 is visible to optical reading devices capable of illuminating indicia 20. For this purpose, the dye may be any suitably human perceivable dye well known in the art. Furthermore, presence of second sound indicia 260 assists in archival image-keeping. This is so because second sound indicia 260 may, at least in part, be identical to first sound indicia 240. This is important because in this case second sound indicia 260 can be used to replicate first sound indicia 240 should first sound indicia 240 become corrupted and unreadable. Use of recorder arrangement 10 is described hereinbelow.

Returning to FIGS. 1 and 4, an operator 270 of reader arrangement 10 positions himself near reader arrangement 10 and manually pivots second portion 100 about pivot pin 90, so that lens 120 faces generally towards operator 270. Next, operator 270 activates battery 220 by moving battery switch 225, so that detector 70 is enabled. That is, when detector 70 is enabled, the following components operate: light source 110, photodetector 140, image sensor electronics 150, memory 160, image processor 170, decoder 180, decompressor 190 and digital to analog converter 200. Operator 270 may then interpose print 30 between operator 270 and lens 120, such that first side 230 of print 30 faces operator 270 and second side 250 faces lens 120. Light emanating from light source 110 is intercepted by second indicia 260 residing on second side 250 of print 30, whereupon the light is reflected to define the previously mentioned reflected light beam 115. Moreover, the operator may be aided in presenting the print to the reader's beam given that if the operator notices the incident light beam 113 passing around the print, it is understood that the print must be moved closer to the reader until light no longer passes around the print. Likewise, if the operator notices the incident light beam 113 passing unevenly around the print, it is understood that the print must be realigned with the beam. Reflected light beam 115 passes through focusing lens 120 and is focused onto a spectral filter 130 that allows a predetermined wavelength of reflected light beam 115 to pass through filter 130. Photodetector 140 detects the predetermined wavelength of reflected beam 115 passing through filter 130 and produces analog charges on photodetector 130. Image sensor electronics 150 drives photodetector 140 data capture by controlling rate of data capture and by converting analog charges on photodetector 140 into digital data format. Memory 160 stores this digital representation of indicia 20. Processor 170 retrieves this data from memory 160 and manages the order in which the data is decoded and decompressed in decoder 180 and decompressor 190, respectively. Digital output data from decompressor 190 is then converted to an analog signal by digital to analog converter 200. The analog signal is supplied to first sound emitter 210 and/or second sound emitter 215 for emitting sound indicative of second indicia 260 detected by detector 70. Thus, operator 10 is able to hear sound contained in second sound-encoded indicia 260 as he simultaneously views image 40 by suitably positioning second portion 100 of detector 70. In this manner, reader arrangement 10 is ergonomically conducive to hearing the sound-encoded information stored on second side 250 as operator 270 simultaneously views image 40 at a convenient viewing angle 275.

Figure 5:
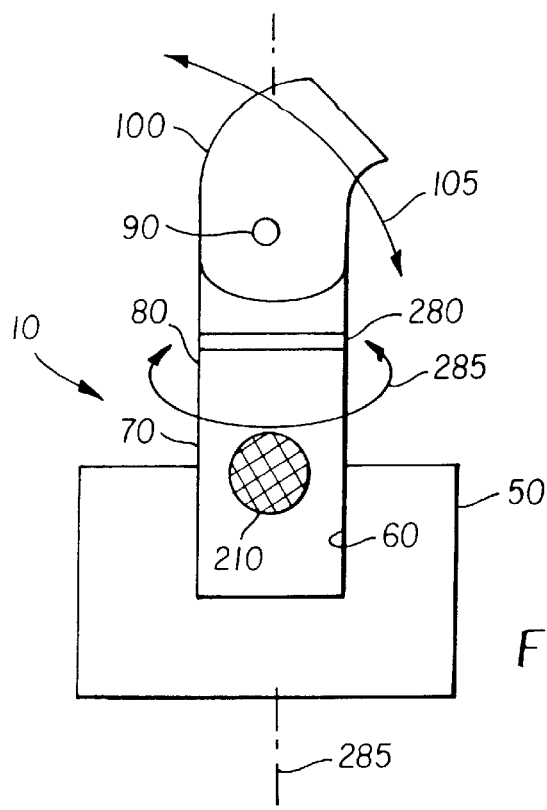
FIG. 5 is a view in elevation of a second embodiment reader arrangement for reading encoded indicia, this second embodiment reader arrangement having two degrees freedom of movement.

Turning now to FIG. 5, there is shown a second embodiment reader arrangement 10. Second embodiment reader arrangement 10 includes the same components as the first embodiment reader arrangement 10 described hereinabove, except that this second embodiment arrangement 10 includes a collar 280 interconnecting first portion 80 to second portion 100 of detector 70. Collar 280 allows second portion 100 to be adjustably rotatable through an angle of approximately 360 degrees about an axis 285 extending longitudinally through first portion 80, as illustrated by double-headed arrow 285. Thus, in the second embodiment of the invention, reader arrangement 10 has at least two degrees freedom of movement. In this regard, a first degree freedom of movement is provided by ability of second portion 100 to pivot generally in direction of arrow 105. A second degree freedom of movement is provided by ability of second portion 100 to rotate generally in direction of arrow 285. It is important to allow at least two degrees freedom of movement. This is important in order to allow user 270 to position reader arrangement 10 so that user 270 can easily position print 30 for detection by detector 70. In this manner, second embodiment of reader arrangement 10 is ergonomically conducive to hearing the sound-encoded information stored on second side 250 as operator 270 views image 40 in any one of a plurality of orientations.

Figure 6:
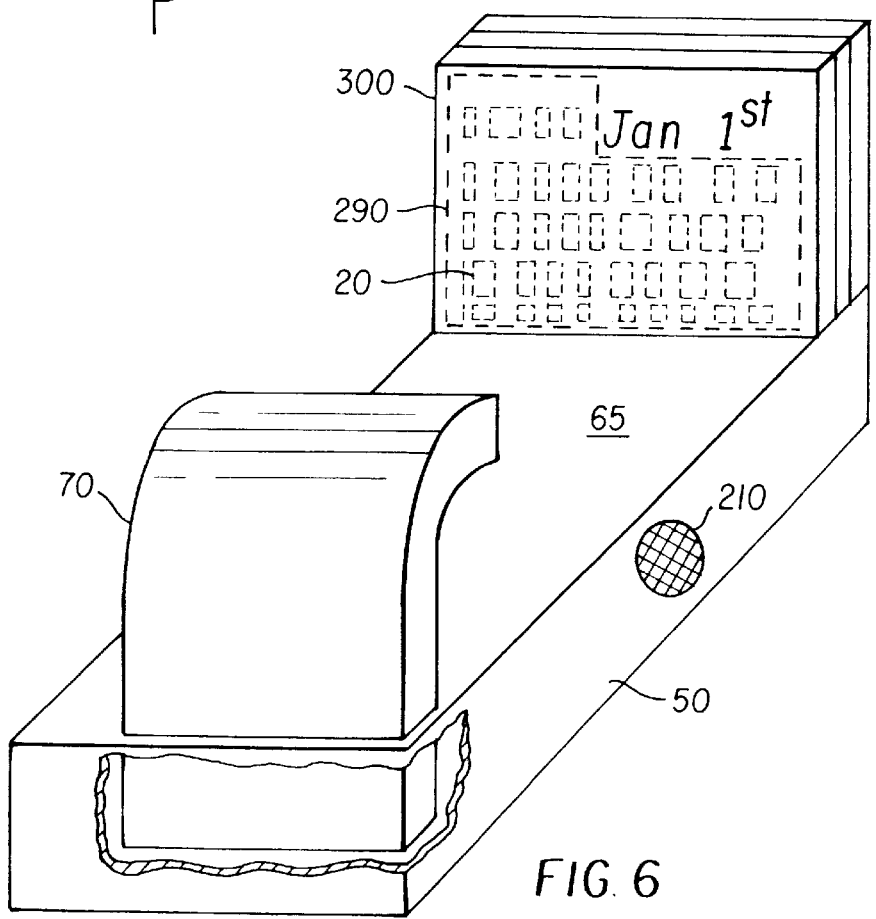
FIG. 6 is a view in perspective of a third embodiment reader arrangement for reading encoded indicia printed on an object mounted on a base.

Referring to FIG. 6, a third embodiment reader arrangement 10 is there shown for reading sound-encoded indicia 20 printed onto a region 290 formed on an object, such as a calendar 300. In this regard, base 50 includes a calendar mount (not shown) for mounting calendar 300 on top surface 65, Sound-encoded indicia 20 may for example be information related to month, day and date; holidays; and/or "thought of the day". Indicia is preferably printed on calendar 300 in invisible dye in order not to detract from appearance of calendar 300. Alternatively, indicia 20 may be printed on calendar 300 in dye visible to the naked eye, if desired.

It may be appreciated from the disclosure hereinabove that an advantage of the present invention is that corrupted indicia on first side 230 of print 30 can be replicated by detecting indicia on second side 250 of print 30. This is so because second sound-encoded indicia 260 may have a portion thereof identical to first sound-encoded indicia 240. Thus, even if first sound indicia 240 is corrupted or otherwise unreadable, detector 70 will read the identical sound file printed on second side 250 of print 30.

It may be further appreciated from the disclosure hereinabove that another advantage of the present invention is that necessarily more sound-encoded data may be stored on print 30. This is so because relative to a single side, twice as much information may be stored when both sides are completely used.

Another advantage of the present invention is that reader arrangement 10 is ergonomically conducive to hearing the sound-encoded information stored on second side 250 as operator 270 simultaneously views image 40. This is so because second portion 100 is pivotable and rotatable to a position convenient for user 270.

Yet another advantage of the present invention is that reader arrangement 10 is independent of an external power source, if desired. This is so, at least in part, because power supplied to detector 70 is by means of rechargeable battery 220 disposed in detector 70.

Still another advantage of the present invention is that sound-encoded information appearing on a multiplicity of prints can be read less laboriously and in shorter time, when compared to prior art devices. This is so because a hand-held detector (i.e., wand) need not be manually passed over second indicia 260. Rather, after second portion 100 is adjusted by user 270, indicia 20 belonging to a multiplicity of prints 30 may be read merely by quickly disposing each successive print between second portion 100 and user 270.

Another advantage of the present invention is that a greater quantity of sound-encoded data can be stored on a print, so as to obviate need for time consuming printing of sound information in multiple layers. This so because area of second side 250 is large enough to retain a relatively large quantity of second sound-encoded indicia 260 (e.g., approximately 3 megabytes on a 8 inch by 10 inch print).

While the invention has been described with particular reference to its preferred embodiments, it will be understood by those skilled in the art that various changes may be made and equivalents may be substituted for elements of the preferred embodiments without departing from the invention. In addition, many modifications may be made to adapt a particular situation and material to a teaching of the present invention without departing from the essential teachings of the invention. For example, detector 70 may have a second spectral filter therein for filtering a second wavelength of light reflected from invisible first indicia 240. In this manner, detector 70 is capable of detecting light of a first wavelength reflected from invisible first indicia 240 in order to read first indicia 240 and also capable of detecting light of a second wavelength reflected from visible second indicia 260 in order to read second indicia 260. As another example, indicia 20 may be other than sound indicia, such as indicia representative of an image.

Moreover, as is evident from the foregoing description, certain other aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

Therefore, what is provided is an adjustable reader arrangement and method of reading sound-encoded indicia formed on an object.

PARTS LIST

10 . . . reader arrangement
20 . . . indicia
30 . . . print
40 . . . image
50 . . . base
60 . . . slot
65 . . . top surface
70 . . . detector
80 . . . first portion (of detector)
90 . . . pivot pin
95 . . . extreme portion (of first portion)
100 . . . second portion (of detector)
105 . . . arrow
110 . . . light source
113 . . . incident light beam
115 . . . reflected light beam
120 . . . lens
130 . . . spectral filter
140 . . . photodetector
150 . . . image sensor electronics
160 . . . memory
170 . . . image processor
180 . . . decoder
190 . . . decompressor
200 . . . digital to analog converter
210 . . . first sound emitter
215 . . . second sound emitter
220 . . . battery
225 . . . battery switch
227 . . . electrical connection
229 . . . step-down transformer
230 . . . first side (of print)
240 . . . first sound-encoded indicia
250 . . . second side (of print)
260 . . . second sound-encoded indicia
270 . . . operator
275 . . . viewing angle
280 . . . collar
285 . . . longitudinal axis
290 . . . region
300 . . . calendar

What is claimed is:

1. An adjustable reader arrangement for reading encoded sound-related indicia, comprising:

(a) an object having encoded first sound-related indicia and an image formed as a print on a first side of said object and encoded second sound-related indicia formed on a second side of said object, the first indicia defining a predetermined first quantity of information associated with the image and being invisible to humans and the second indicia defining a predetermined second quantity of information associated with the image, the second quantity of information including the first quantity of information;

(b) a base disposed relative to said object;

(c) a detector removably connected to said base for detecting the first indicia and the second indicia, said detector having a first portion adapted to be removably connected to said base and a second portion adjustable into alignment with the first indicia or the second indicia formed on said object, wherein the second portion of said detector is adjustably pivotable through an angle of approximately 120 degrees with respect to the first portion of said detector and wherein the second portion of said detector is adjustably rotatable through an angle of approximately 360 degrees about a longitudinal axis extending through the first portion; and (d) a sound emitter coupled to said detector for emitting a sound indicative of the first indicia and the second indicia detected by said detector.

2. The reader arrangement of claim 1, wherein said base defines a slot therein for matingly receiving the first portion of said detector, so that the first portion is stationary with respect to said base.

3. The reader arrangement of claim 1, wherein said detector comprises:

(a) a light source for emitting a light beam to be reflected by the first or second indicia; and (b) a photodetector associated with said light source for detecting the reflected light beam.

4. The reader arrangement of claim 1, further comprising a portable power source coupled to said detector for supplying electrical power to said detector in order to electrically operate said detector.

5. An adjustable reader arrangement for reading encoded sound-related indicia, comprising:

(a) an object disposed in a predetermined orientation and having encoded first sound-related indicia and an image formed as a print on a first side of said object and encoded second sound-related indicia formed on a second side of said object, the first indicia defining a predetermined first quantity of information associated with the image and being invisible to humans and the second indicia defining a predetermined second quantity of information associated with the image, the second quantity of information including the first quantity of information;

(b) a base having a slot therein and disposed relative to said object;

(c) a detector removably connected to said base for detecting the first indicia and the second indicia, said detector having a first portion sized to be matingly received in the slot, so that the first portion is stationary with respect to said base, the first portion of said detector defining a pivot point thereon, said detector having a second portion adjustably pivotable through an angle of approximately 120 degrees about the pivot point and wherein the second portion is adjustably rotatable through an angle of approximately 360 degrees about a longitudinal axis extending through the first portion for alignment with the second indicia formed on the object for detecting the second indicia while the first portion of said detector is stationary with respect to said base and while the object is disposed in the predetermined orientation, said detector being removable from said base in order to detect the first indicia, said detector including:

(i) a light source for emitting a light beam to be reflected by the first indicia or the second indicia;

(ii) a photodetector associated with said light source for detecting the light reflected by the first indicia or the second indicia in order to detect the first indicia or the second indicia; and (d) a sound emitter coupled to said detector for emitting a sound indicative of the first indicia or the second indicia detected by said detector.

6. The reader arrangement of claim 5, further comprising a battery coupled to said detector for supplying electrical power to said detector in order to electrically operate said detector, so that said detector is capable of detecting first and second the indicia.

7. An adjustable reader arrangement for reading encoded sound-related indicia, comprising:
  (a) an object having a first side thereof having a first sound-related indicia and an image formed as a print thereon and having a second side thereof having a second sound-related indicia thereon, the object being disposed in a predetermined orientation, the first indicia on the first side defining a predetermined first quantity of information associated with the image and being formed of a dye invisible to humans and the second indicia on the second side defining a predetermined second quantity of information associated with the image and being formed of a dye visible to humans;
  (b) a base disposed relative to said object, said base having a slot therein;
  (c) a detector removably connected to said base for detecting the first indicia and the second indicia, said detector having a first portion sized to be matingly received in the slot, so that the first portion of said detector is stationary with respect to said base while the first portion is received in the slot, said detector defining a pivot point thereon and having a second portion adjustably pivotable through an angel of approximately 120 degrees about the pivot point and adjustably rotatable through an angle of approximately 360 degrees about a longitudinal axis extending through the first portion for alignment with the first indicia and the second indicia formed on said object while said object is disposed in the predetermined orientation; and
  (d) a sound emitter coupled to said detector for emitting a sound indicative of the first indicia and the second indicia detected by said detector.

8. An object having a first side and a second side, comprising:
  (a) an encoded first sound-related indicia and an image formed as a print on the first side of the object, said first indicia defining a predetermined first quantity of information associated with the image; and
  (b) an encoded second sound-related indicia formed on the second side of the object, said second indicia defining a predetermined second quantity of information associated with the image, the second quantity of information including the first quantity of information, wherein the second quantity of information defined by said second indicia is greater than the first quantity of information defined by said first indicia, wherein the first indicia on the first side is formed so as to be invisible to humans, wherein the second indicia on the second side is formed of a dye visible to humans and wherein at least one of the first and second indicia is surrounded by a border not containing indicia.

9. A method of assembling an adjustable reader arrangement for reading encoded indicia comprising the steps of:
  (a) removably connecting a detector to a base for detecting encoded first sound-related indicia and an image formed as a print on a first side of an object and encoded second sound-related indicia formed on a second side of the object, the first indicia defining a predetermined first quantity of information associated with the image and being invisible to humans and the second indicia defining a predetermined second quantity of information associated with the image, the second quantity of information including the first quantity of information, the detector having a first portion adapted to be removably connected to the base and a second portion adjustable into alignment with the first indicia and the second indicia formed on the object, wherein the step of connecting a detector includes the step of connecting a detector having the second portion of the detector adjustably pivotable through an angle of approximately 120 degrees with respect to the first portion of the detector and wherein the step of connecting a detector includes the step of connecting a detector having the second portion adjustably rotatable through an angle of approximately 360 degrees about an axis extending longitudinally through the first portion; and
  (b) coupling an emitter to the detector for emitting a signal indicative of the first indicia and the second indicia detected by the detector.

10. The method of claim 9, wherein the step of removably connecting a detector to a base comprises the step of defining a slot in the base for matingly receiving the first portion of the detector, so that the first portion is stationary with respect to the base.

11. The method of claim 9, wherein the step of connecting the detector comprises the steps of:
  (a) providing a light source for emitting a light beam to be reflected by the first or second indicia; and
  (b) providing a photodetector associated with the light source for detecting the reflected light beam.

12. The method of claim 9, further comprising the step of coupling a power source to the detector for supplying electrical power to the detector in order to electrically operate the detector.

13. A method of assembling an adjustable reader arrangement for reading encoded sound-related indicia comprising the steps of:
  (a) removably connecting a detector to a base for detecting encoded first sound-related indicia formed on a first side of an object and encoded second sound-related indicia formed on a second side of the object, the first side having an image formed as a print thereon, the first indicia on the first side being formed of a dye invisible to humans and the second indicia on the second side being formed of a dye visible to humans, the first indicia defining a predetermined first quantity of information associated with the image and the second indicia defining a predetermined second quantity of information associated with the image and including the first quantity of information, the base having a slot therein and the detector having a first portion sized to be matingly received in the slot, so that the first portion is stationary with respect to the base, the first portion of the detector defining a pivot point thereon, the detector having a second portion adjustably pivotable through an angle of approximately 120 degrees about the pivot point and adjustably rotatable through an angle of approximately 360 degrees about a longitudinal axis extending through the first portion for alignment with the second indicia formed on the object while the object is disposed in the predetermined orientation, the detector being removable from the base in order to detect the first indicia, the step of connecting a detector including the steps of:
    (i) providing a light source for emitting a light beam to be reflected by the first indicia or the second indicia;
    (ii) providing a photodetector associated with the light source for detecting the light reflected by the first indicia or the second indicia in order to detect the first indicia or the second indicia; and
  (b) coupling a sound emitter to the detector for emitting a sound indicative of the first indicia or the second indicia detected by the detector.

14. The method of claim 13, further comprising the step of coupling a battery to the detector for supplying electrical power to the detector in order to electrically operate the detector, so that the detector is capable of detecting the first and second indicia.

15. A method of assembling an adjustable reader arrangement for reading encoded sound-related indicia comprising the steps of:
(a) providing an object having encoded first sound-related indicia and an image formed as a print on a first side thereof and encoded second sound-related indicia on a second side thereof, the first indicia on the first side defining a predetermined first quantity of information associated with the image and being formed of a dye invisible to humans and the second indicia on the second side defining a predetermined second quantity of information associated with the image and being formed of a dye visible to humans;
(b) removably connecting a detector to a base for detecting the first indicia and the second indicia, the base having a slot therein and the detector having a first portion sized to be matingly received in the slot, so that the first portion of the detector is stationary with respect to the base while the first portion is received in the slot, the detector defining a pivot point thereon and having a second portion adjustably pivotable through an angle of approximately 120 degrees about the pivot point and adjustably rotatable through an angle of approximately 360 degrees about a longitudinal axis extending through the first portion for alignment with the first indicia or the second indicia formed on the object; and
(c) coupling a sound emitter to the detector for emitting a sound indicative of the first indicia or the second indicia detected by the detector.

16. A method of providing an object having encoded sound-related information stored on a first side and a second side thereof, comprising the steps of:
(a) forming an encoded first sound-related indicia and an image formed as a print on the first side of the object, the first indicia defining a predetermined first quantity of information associated with the image; and
(b) forming an encoded second sound-related indicia on the second side of the object, the second indicia defining a predetermined second quantity of information associated with the image and including the first quantity of information, wherein the step of forming second encoded indicia on the object includes the step of forming second encoded indicia having the second quantity of information greater than the first quantity of information, wherein the step of forming first encoded indicia on the object includes the step of forming first encoded indicia formed of a dye invisible to humans, wherein the step of forming second encoded indicia on the object includes the step of forming second encoded indicia formed of a dye visible to humans and wherein at least one of the first and second indicia is surrounded by a border not containing indicia.

* * * * *